United States Patent
Blitzstein (10) Patent No.: US 10,298,592 B2
(45) Date of Patent: *May 21, 2019

(54) PORTABLE ELECTRONIC DEVICE WITH USER-CONFIGURABLE API DATA ENDPOINT

(71) Applicant: eBay Inc., San Jose, CA (US)

(72) Inventor: Jared Blitzstein, Limerick, PA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,082

(22) Filed: Oct. 19, 2017

(65) Prior Publication Data

US 2018/0103041 A1    Apr. 12, 2018

Related U.S. Application Data

(63) Continuation of application No. 14/622,697, filed on Feb. 13, 2015, now Pat. No. 9,825,959.

(51) Int. Cl.
*G06F 7/04* (2006.01)
*H04L 29/06* (2006.01)
*H04L 29/08* (2006.01)

(52) U.S. Cl.
CPC ............ *H04L 63/102* (2013.01); *H04L 63/10* (2013.01); *H04L 67/10* (2013.01); *H04L 67/20* (2013.01)

(58) Field of Classification Search
CPC ....... H04L 63/10; H04L 63/102; H04L 67/10; H04L 67/20
USPC .............................................. 726/4; 713/193
See application file for complete search history.

(56) References Cited

U.S. PATENT DOCUMENTS

| 5,832,211 | A  | * | 11/1998 | Blakley, III | G06F 21/31 |
| | | | | | 713/155 |
| 8,639,289 | B2 | * | 1/2014 | Dagorn | H04L 63/0853 |
| | | | | | 455/414.1 |
| 8,655,341 | B2 | * | 2/2014 | Boukai | G06F 8/61 |
| | | | | | 455/418 |
| 9,825,959 | B2 | | 11/2017 | Blitzstein | |

(Continued)

FOREIGN PATENT DOCUMENTS

WO    WO 2009156995 A1 * 12/2009 ............... G06F 8/61
WO       2016130613 A1    8/2016

OTHER PUBLICATIONS

U.S. Appl. No. 14/622,697, filed Feb. 13, 2015, Portable Electronic Device With User-Configurable API Data Endpoint.

(Continued)

*Primary Examiner* — Samson B Lemma
(74) *Attorney, Agent, or Firm* — Schwegman Lundberg & Woessner, P.A.

(57) ABSTRACT

Systems, devices methods and media are provided for selecting data received from or sent by a client device. In one example, a system is configured to initiate a user-configurable API data endpoint on the client device and issue a request for access to specified data residing on the client device. The specified data resides in a first user-designated storage area on the client device. In response to receiving an authorization by a user of the client device of the access request, the system communicates with the user-configurable API data endpoint on the client device to perform a data-pull of at least some of the requested specified data from a second user-designated data pull portion of data residing on the client device.

18 Claims, 5 Drawing Sheets

(56) References Cited

U.S. PATENT DOCUMENTS

| | | | | |
|---|---|---|---|---|
| 2004/0233893 | A1* | 11/2004 | Zhou | H04L 63/0838 370/352 |
| 2006/0005024 | A1* | 1/2006 | Law | G06F 21/43 713/168 |
| 2010/0151823 | A1* | 6/2010 | Dagorn | H04L 63/0853 455/411 |
| 2013/0072153 | A1* | 3/2013 | Lawson | H04L 63/10 455/410 |
| 2013/0081101 | A1* | 3/2013 | Baer | G06F 21/577 726/1 |
| 2016/0241562 | A1 | 8/2016 | Blitzstein | |

OTHER PUBLICATIONS

"U.S. Appl. No. 14/622,697, Advisory Action dated May 16, 2017", 5 pgs.

"U.S. Appl. No. 14/622,697, Corrected Non Final Office Action dated Jun. 2, 2016", 17 pgs.

"U.S. Appl. No. 14/622,697, Final Office Action dated Apr. 7, 2017", 23 pgs.

"U.S. Appl. No. 14/622,697, Final Office Action dated Oct. 21, 2016", 15 pgs.

"U.S. Appl. No. 14/622,697, Non Final Office Action dated May 12, 2016", 18 pgs.

"U.S. Appl. No. 14/622,697, Non Final Office Action dated Dec. 20, 2016", 22 pgs.

"U.S. Appl. No. 14/622,697, Notice of Allowance dated Jul. 19, 2017", 18 pgs.

"U.S. Appl. No. 14/622,697, Response filed Mar. 13, 2017 to Non Final Office Action dated Dec. 20, 2016", 10 pgs.

"U.S. Appl. No. 14/622,697, Response filed May 1, 2017 to Final Office Action dated Apr. 7, 2017", 8 pgs.

"U.S. Appl. No. 14/622,697, Response filed Jul. 6, 2017 to Advisory Action dated May 16, 2017", 8 pgs.

"U.S. Appl. No. 14/622,697, Response filed Jul. 8, 2016 to Non Final Office Action dated May 12, 2016", 18 pgs.

"U.S. Appl. No. 14/622,697, Response filed Dec. 2, 2016 to Final Office Action dated Oct. 21, 2016", 9 pgs.

"International Application Serial No. PCT/US2016/017244, International Preliminary Report on Patentability dated Aug. 24, 2017", 8 pgs.

"International Application Serial No. PCT/US2016/017244, International Search Report dated Apr. 25, 2016", 3 pgs.

"International Application Serial No. PCT/US2016/017244, Written Opinion dated Apr. 25, 2016", 6 pgs.

* cited by examiner

PORTABLE ELECTRONIC DEVICE WITH USER-CONFIGURABLE API DATA ENDPOINT

CLAIM OF PRIORITY

This Application is a continuation of U.S. application Ser. No. 14/622,697, filed Feb. 13, 2015, which is hereby incorporated by reference in its entirety.

TECHNICAL FIELD

Embodiments of the present disclosure relate generally to data processing and, more particularly, but not by way of limitation, to portable electronic (client) devices having user-configurable data endpoints for controlled transmission and use of personal data. In one example, a user-configurable API data endpoint in a personal mobile device can be controllably exposed to a system requesting access to data residing on the personal mobile device.

BACKGROUND

Conventionally, users are not able to leverage data already residing on their mobile devices when they are required to enter data into other computerized systems. For example, a user may be asked to provide extensive personal data, for instance requiring the manual completion of many forms when registering as a new patient at a medical practice. The present inventive subject matter seeks to address these and other drawbacks and inconveniences.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document. Some embodiments are illustrated by way of example and not limitation in the figures of the accompanying drawings in which.

The headings provided herein are merely for convenience and do not necessarily affect the scope or meanings of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In this specification, the terms "portable electronic client device," "client device," "mobile device," "smart phone" and the like are used interchangeably.

One aspect of the inventive subject matter gives mobile device users the ability to turn their SMS or mobile device into an application programming interface (API) endpoint that can be accessed by authorized parties. This provides an easy way to share personal information residing on the device in a "pull" model instead of a "push" model. This can be useful for vendors or third parties that require personal information for medical forms, telephone numbers, email addresses (for example), or other data that may be specified and which may generally be present on a smart phone. A user can, in one example, enter their phone number or a personal address into the third party system and make a request for all or portions of the applicable data on the phone to be entered into the system. The user may receive a prompt, included in an SMS text for example, requesting authorization for the data to be transmitted. Once authorized, that data will be transmitted and entered in the third party system records. Other examples include filling out checkout pages that require personal information at point-of-sale ("POS") stations in systems that require personal information such as addresses, billing information, email addresses, and the like.

In one example, a third party requesting personal data may be a pharmacy or medical practice, and the request to access information residing on a user's mobile device may (or may not) be based on a proximity or location detection. Existing communication structures may be used, but one example contemplates the use of standard SMS messaging for exchange or requests, authorizations and data. The inventive subject matter also proposes the access to and transmission of user-specified levels and sources of data residing on the mobile device.

In further aspects of the inventive subject matter, a user of the mobile device has the ability, via the device, to identify a third party requesting access to information residing on the device. The user can select which level of information to share with the third party, or which fields of information to share. For instance, an API data endpoint in the device can be configured to share driver's license information, but not medical restrictions or sensitive information, for example a social security number that might be part of that data set. The data residing on the device remains under the personal control of the user. The source data is maintained locally rather than curated or maintained at an external database. The device user can also configure the API data endpoint to control where data (residing on the device) is to be sourced from, for example from a particular "contact" in the mobile device or a saved "note" in a file system or database in the mobile device.

In other aspects, a third party requesting information from a mobile device has the ability to specify a recipient of the request, and to specify a type of request, for example a request for a "Mailing Address" or "Driver's License Data". The third party can specify required fields to establish data compatibility. In another example, if a driver's license number is required by a third party but the user has disabled that data field or has not provided the requested data, the third party system provides an alert.

Thus, in some examples, a system comprises at least one module, executing on at least one processor of a machine, configured to issue a request for access to data residing on a client device; in response to receiving an authorization of the request, the system communicates with a user-configurable API data endpoint on the client device to retrieve at least some of the requested data and store the requested data in a database.

The request for access to data residing on the client device may be included in an SMS message issued to the client device, or may be issued in response to an instruction, received from the client device, to access the data residing on the client device.

The user-configurable API data endpoint in the mobile device may be configurable to allow access by the at least one module only to a user-designated portion of the data residing on the client device. The at least one module may be further configured to specify a recipient of the request and/or a type of data to be retrieved. Further, the at least one module may be further configured to specify a data characteristic to establish a data compatibility for a successful retrieval of at least some of the requested data.

In another aspect, a method comprises issuing a request for access to data residing on a client device, and in response to receiving an authorization of the request, communicating with a user-configurable API data endpoint on the client device to retrieve at least some of the requested data and storing the requested data in a database.

The method may further comprise including the request for access to data residing on the client device in an SMS message issued to the client device. The request for access to the data residing on the client device may be issued in response to an instruction, received from the client device, to access the data residing on the client device.

In further aspects, the user-configurable API data endpoint is configurable to allow access by the at least one module only to a user-designated portion of the data residing on the client device. The at least one module may be further configurable to specify a recipient of the request and/or a type of data to be retrieved. Further, the at least one module may be further configurable to specify a data characteristic to establish a data compatibility for a successful retrieval of at least some of the requested data.

In a further example, a non-transitory machine-readable medium includes instructions which, when read by a processor of a machine, cause the machine to issue a request for access to data residing on a client device and, in response to receiving an authorization of the request, communicate with a user-configurable API data endpoint on the client device to retrieve at least some of the requested data and store the requested data in a database.

In another example, a portable electronic client device comprises at least one module, executing on at least one processor, configured to communicate with a system requesting access to data residing on the portable client device; and an API data endpoint, configurable by a user of the portable electronic client device via an application running on the portable electronic device, to confirm, in conjunction with the at least one module, the identity of the system requesting access to data residing on the portable electronic client device and identify a level of data to be transmitted to the system requesting access to the data residing on the portable electronic client device.

The API data endpoint may be configurable by the user to identify within the portable electronic client device a data type or source of the data to be transmitted to the system requesting access to the data on the portable electronic client device.

Figure 1:
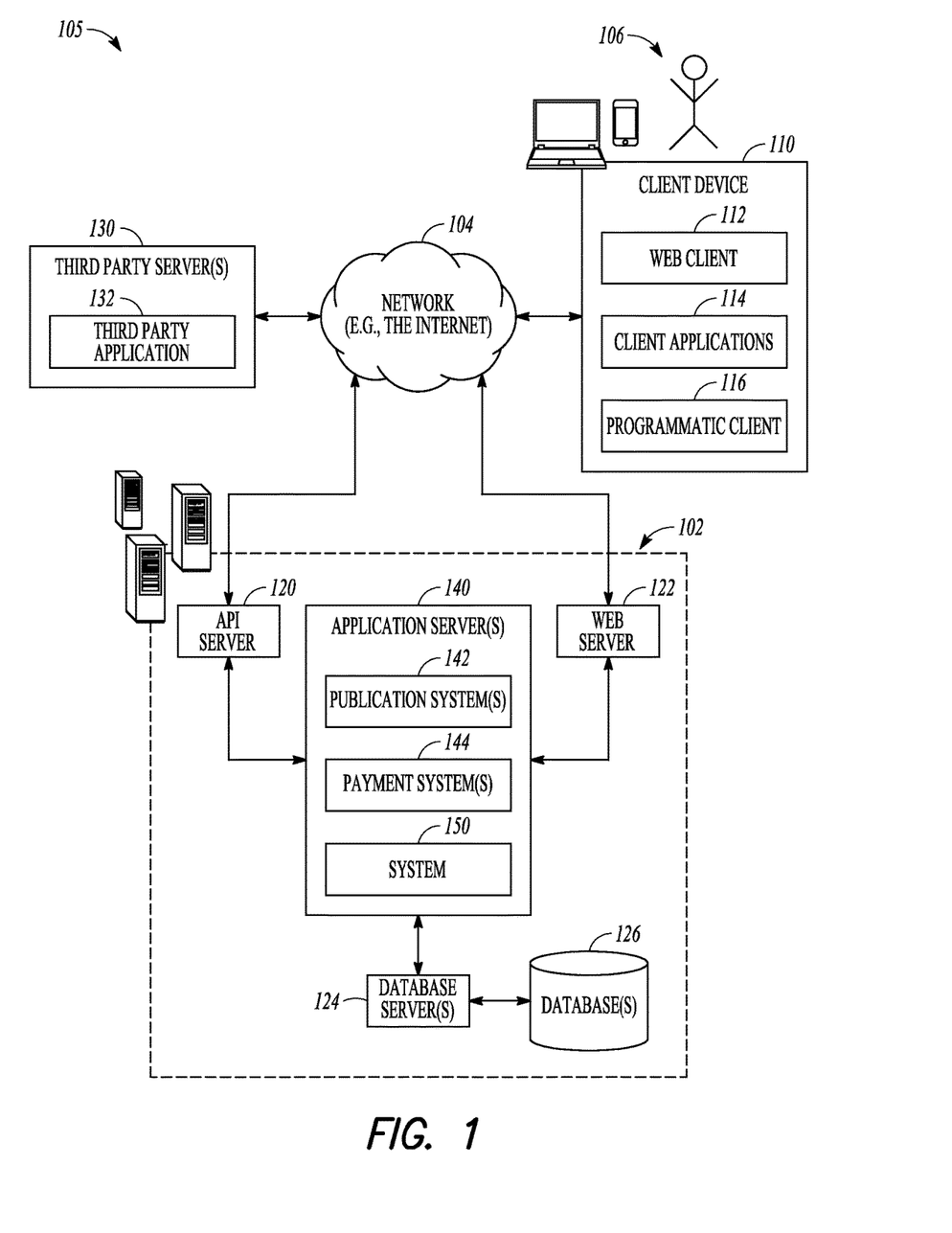
FIG. 1 is a block diagram depicting a networked system, according to an example embodiment.

With reference to FIG. 1, an example embodiment of a high-level client-server-based network architecture 100 is shown. A networked system 102, in the example forms of a publication system such as network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), one or more data endpoint configuration client application(s) 114, and a programmatic client 116 executing on client device 110. One of the applications 114, namely a data endpoint configuration application, is discussed further below.

The client device 110 may comprise, but is not limited to, a mobile phone, desktop computer, laptop, portable digital assistants (PDAs), smart phones, tablets, ultra books, netbooks, laptops, programmable consumer electronics, and the like, or any other communication device that a user may utilize to access the networked system 102. In some embodiments, the client device 110 may comprise a display module (not shown) to display information (e.g., in the form of user interfaces). In further embodiments, the client device 110 may comprise one or more of a touchscreen, accelerometer, gyroscope, camera, microphone, global positioning system (GPS) device, and so forth. The client device 110 may be a device of a user that is used to perform a transaction involving digital items within the networked system 102.

In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with the client device 110. In embodiments, the user 106 is not part of the network architecture 100, but may interact with the network architecture 100 via the client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications 114 (also referred to as "apps") such as, but not limited to, a web browser, data endpoint configuration application, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as-needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application server(s) 140 may host one or more publication systems 142 and payment systems 144, each of which may comprise one or more modules or applications and each of which may be embodied as hardware, software, firmware, or any combination thereof. The application server(s) 140 is, in turn, shown to be coupled to one or more database servers 124 that facilitate access to one or more information storage repositories or database(s) 126. In an example embodiment, the database(s) 126 is a storage device that stores information to be posted (e.g., publications or listings) to the publication system(s) 120. The database(s) 126 may also store digital item information in accordance with example embodiments.

The API server 120 can communicate via the network 104 with a user-configurable API data endpoint on the client device 110. The API data endpoint on the client device 110 is configurable by a user (e.g., user 106) of the client device 110 using a data endpoint configuration client application 114 mentioned further above. Viewed from the perspective of the client device 110, a user 106 can identify a third party, such as the application server(s) 140 or third-party server(s) 130, requesting access to information residing on the client device 110. If the user 106 wishes to respond to the request, the user 106 can select or configure, by means of the data endpoint configuration client application 114, what type, content, or level of information to share with the third party, or which fields of information to share. In one example, an API data endpoint in the client device 110 accessible via the network 104 can be configured by the user 106 to share driver's license information, but not medical restrictions or sensitive information, for example a social security number that might be part of that data set. In this way, the data residing on the client device 110 remains under the personal control of the user 106. The source of the personal data is maintained and controlled locally rather than curated at an external database. The personal data on the client device 110 is sent to a third party in a peer-to-peer arrangement, as opposed to a central repository model. The device user 106 can, in another example, also configure the API data endpoint to control where data (residing on the client device 110) is to be sourced from, for example a particular "contact" in the client device 110 or a saved "note" in a file system or database in the client device 110.

From the perspective of the API server 120 at a system 102 (or third party server(s) 130), a third party requesting personal information from a mobile (client) device 110 has the ability to specify a recipient of the request (for example, user 106), and to specify a type of request, for example a request for a "Mailing Address" or "Driver's License Data".

In one example, the third party can specify fields or characteristics of data to be extracted from the client device 110 to establish data compatibility and successful data transfer from client device 110 to API server 120 (or third party server(s) 130). In another example, if a driver's license number is required by a third party, but the user 106 has disabled that data field or has not provided the requested data, the third party system provides an alert.

Figure 4:
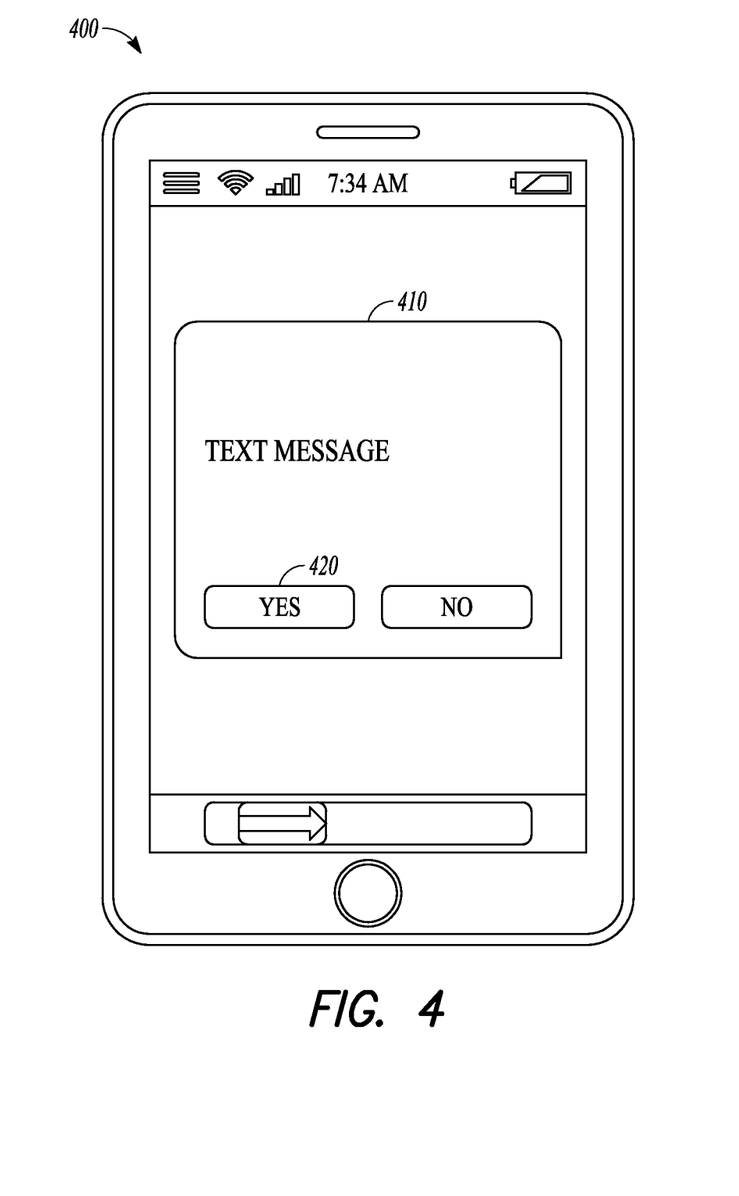
FIG. 4 is a schematic diagram illustrating a mobile device, according to an example embodiment.

SMS is a particularly convenient mode of communication for users of mobile devices, smart phones, and the like. A request to access information residing on a client device 110 may be embedded in an SMS text sent to it. For example, with reference to FIG. 4, a text message 410 sent to a mobile phone 400 (e.g., client device 110, FIG. 1) may read "Send Medical Note and Doctor Contact to Pharmacy?" to which a user may respond "Yes" (at 420) or "No". In the event "Yes" is selected, the user-configured API data endpoint on the mobile phone 400 is allowed to communicate with the API server of the requesting party (in this case the pharmacy) to transmit the selected data to the API server (e.g., API server 120, FIG. 1).

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

A personalization system 150 in the networked system 102 may provide functionality operable to perform various personalizations using the user selected data extracted from the client device 110. For example, the personalization system 150 may, with authorization, access supplementary user selected data from the database(s) 126, the third party server(s) 130, the publication system(s) 142, and other sources. In some example embodiments, the personalization system 150 may analyze the user data to perform personalization of user preferences. As more content is added to data fields by the user, the personalization system 150 can further refine the personalization. In some example embodiments, the personalization system 150 may communicate with the publication system(s) 142 to update data received from the client device 110, or repeat a request for access to such information. In an alternative embodiment, the personalization system 150 may be a part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and personalization system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Methods

Figure 5:
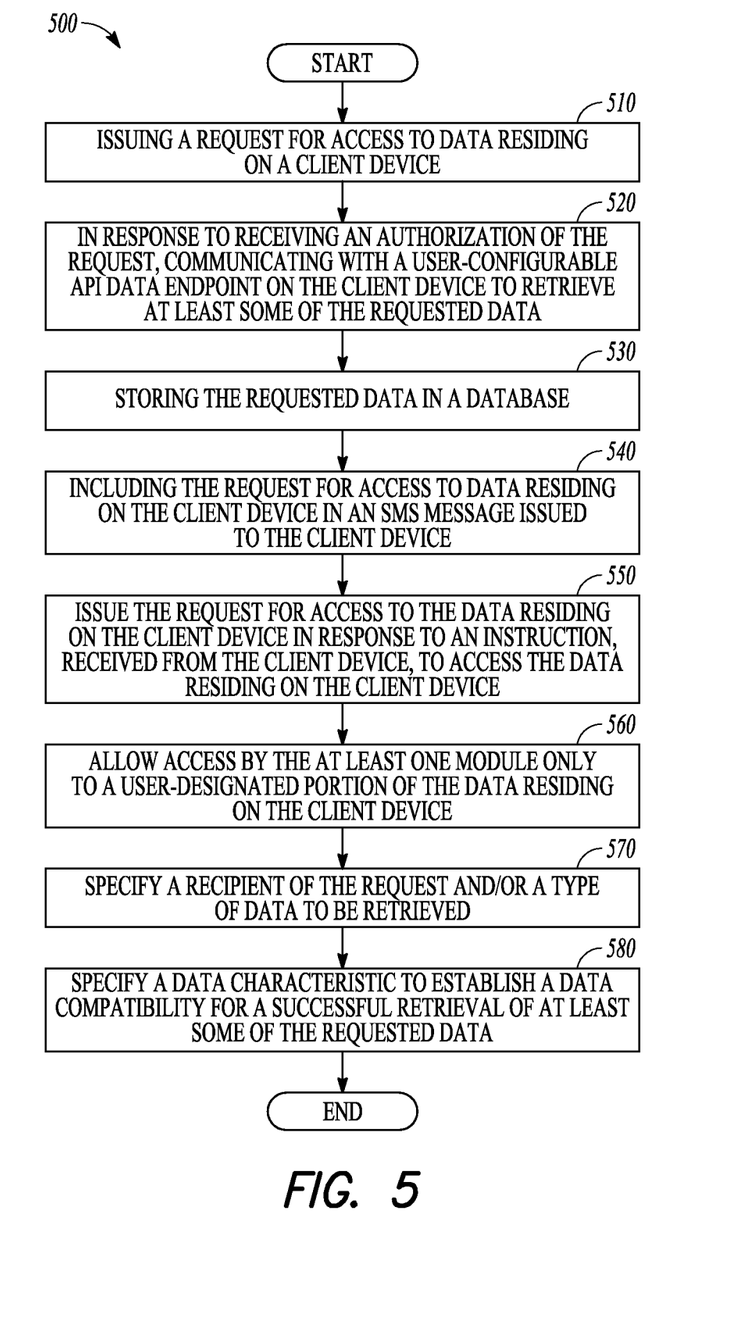
FIG. 5 is a flow diagram illustrating a method, according to an example embodiment.

FIG. 5 is a flowchart illustrating a method 500 in accordance with some embodiments. The operations of the method 500 may be performed by the client device 110, and/or a server included in the networked system 102 (e.g., API server 120, web server 122, or application servers 140). The operations may be performed by modules included in the networked system 102. The various operations of the method 500 may be performed in a different order and the method 500 may include only some of the operations described below.

The method 500 includes, at operation 510, issuing a request for access to data residing on a client device; at operation 520, in response to receiving an authorization of the request, communicating with a user-configurable API data endpoint on the client device to retrieve at least some of the requested data; and at operation 530, storing the requested data in a database.

The method 500 may further comprise, at operation 540, including the request for access to data residing on the client device in an SMS message issued to the client device. At operation 550, the request for access to the data residing on the client device may be issued in response to an instruction, received from the client device, to access the data residing on the client device. At operation 560, the user-configurable API data endpoint may be configured to allow access by the at least one module only to a user-designated portion of the data residing on the client device.

In a further example, the at least one module is further configured at operation 570 to specify a recipient of the request and/or a type of data to be retrieved. Still further, the at least one module is configured at operation 580 to specify a data characteristic to establish a data compatibility for a successful retrieval of at least some of the requested data.

Machine and Software Architecture

The modules, methods, applications and so forth described in conjunction with FIGS. 1-5 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 2:
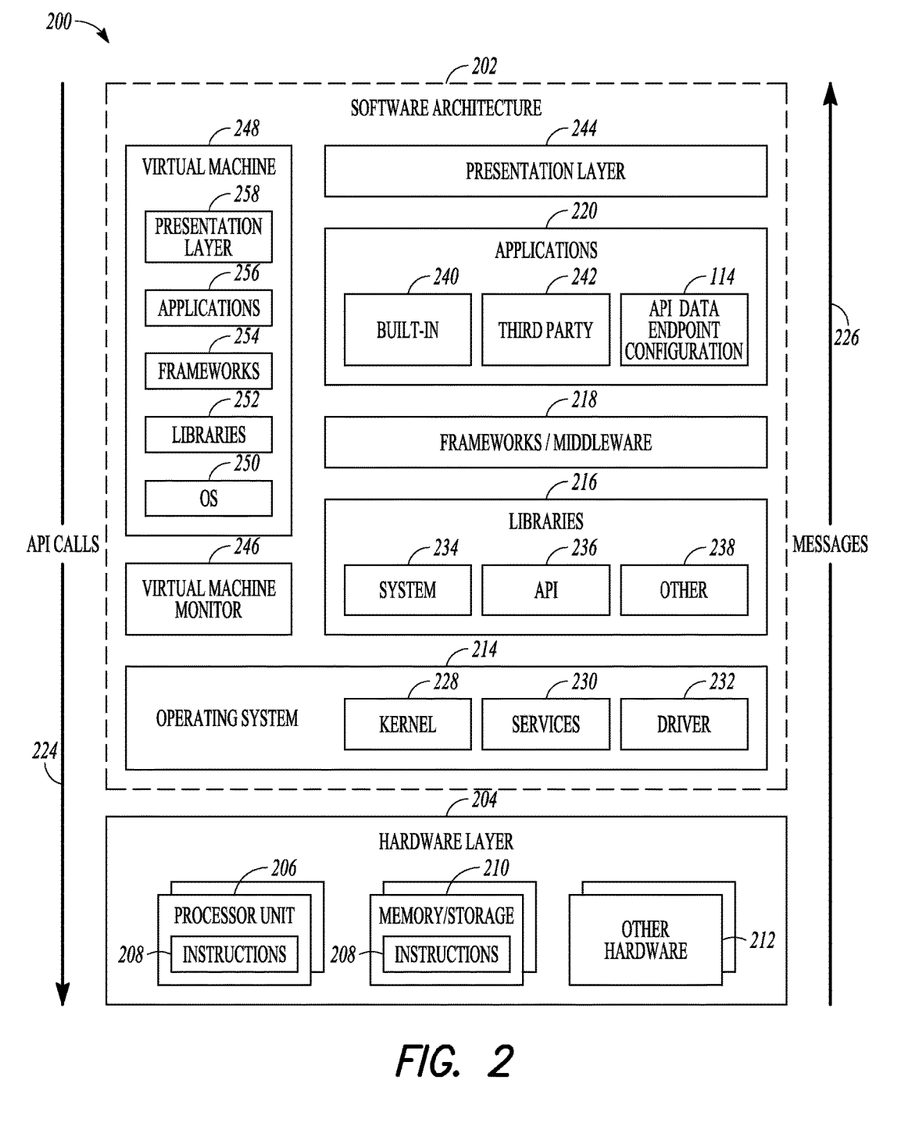
FIG. 2 is a block diagram illustrating an example of a software architecture that may be installed on a machine, according to some example embodiments.

FIG. 2 is a block diagram 200 illustrating a representative software architecture 202, which may be used in conjunction with various hardware architectures herein described. FIG. 2 is merely a non-limiting example of a software architecture 202 and it will be appreciated that many other architectures may be implemented to facilitate the functionality described herein. The software architecture 202 may be executing on hardware such as machine 300 of FIG. 3 that includes, among other things, processors 310, memory 330, and I/O components 350. A representative hardware layer 204 is illustrated and can represent, for example, the machine 300 of FIG. 3. The representative hardware layer 204 comprises one or more processing units 206 having associated executable instructions 208. Executable instructions 208 represent the executable instructions of the software architecture 202, including implementation of the methods, modules and so forth of FIGS. 1-5. Hardware layer 204 also includes memory and/or storage modules 210, which also have executable instructions 208. Hardware layer 204 may also comprise other hardware as indicated by 212 which represents any other hardware of the hardware layer 204, such as the other hardware illustrated as part of machine 300.

In the example architecture of FIG. 2, the software architecture 202 may be conceptualized as a stack of layers where each layer provides particular functionality. For example, the software architecture 202 may include layers such as an operating system 214, libraries 216, frameworks/middleware 218, applications 220 and presentation layer 244. Operationally, the applications 220 and/or other components within the layers may invoke application programming interface (API) calls 224 through the software stack and receive a response, returned values, and so forth illustrated as messages 226 in response to the API calls 224. The layers illustrated are representative in nature and not all software architectures have all layers. For example, some mobile or special purpose operating systems may not provide a frameworks/middleware 218, while others may provide such a layer. Other software architectures may include additional or different layers.

The operating system 214 may manage hardware resources and provide common services. The operating system 214 may include, for example, a kernel 228, services 230, and drivers 232. The kernel 228 may act as an abstraction layer between the hardware and the other software layers. For example, the kernel 228 may be responsible for memory management, processor management (e.g., scheduling), component management, networking, security settings, and so on. The services 230 may provide other common services for the other software layers. The drivers 232 may be responsible for controlling or interfacing with the underlying hardware. For instance, the drivers 232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 216 may provide a common infrastructure that may be utilized by the applications 220 and/or other components and/or layers. The libraries 216 typically provide functionality that allows other software modules to perform tasks in an easier fashion than to interface directly with the underlying operating system 214 functionality (e.g., kernel 228, services 230 and/or drivers 232). The libraries 216 may include system libraries 234 (e.g., C standard library) that may provide functions such as memory allocation functions, string manipulation functions, mathematic functions, and the like. In addition, the libraries 216 may include API libraries 236 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 216 may also include a wide variety of other libraries 238 to provide many other APIs to the applications 220 and other software components/modules.

The frameworks/middleware 218 (also sometimes referred to as middleware) may provide a higher-level common infrastructure that may be utilized by the applications 220 and/or other software components/modules. For example, the frameworks/middleware 218 may provide various graphic user interface (GUI) functions, high-level resource management, high-level location services, and so forth. The frameworks/middleware 218 may provide a broad spectrum of other APIs that may be utilized by the applications 220 and/or other software components/modules, some of which may be specific to a particular operating system or platform.

The applications 220 include built-in applications 240 and/or third party applications 242. Examples of representative built-in applications 240 may include, but are not limited to, a contacts application, a browser application, a book reader application, a location application, a media application, a messaging application, and/or a game application. Third party applications 242 may include any of the built-in applications 240 as well as a broad assortment of other applications. In a specific example, the third party applications 242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party applications 242 may invoke the API calls 224 provided by the mobile operating system such as operating system 214 to facilitate functionality described herein. The applications 220 may include an API data endpoint configuration client application 114 as described above.

The applications 220 may utilize built in operating system functions (e.g., kernel 228, services 230 and/or drivers 232), libraries (e.g., system libraries 234, API libraries 236, and other libraries 238), and frameworks/middleware 218 to create user interfaces to interact with users of the system. Alternatively, or additionally, in some systems, interactions with a user may occur through a presentation layer, such as presentation layer 258. In these systems, the application/module "logic" can be separated from the aspects of the application/module that interact with a user.

Some software architectures utilize virtual machines. In the example of FIG. 2, this is illustrated by virtual machine 248. A virtual machine creates a software environment where applications/modules can execute as if they were executing on a hardware machine (such as the machine of FIG. 3, for example). A virtual machine is hosted by a host operating system (operating system 214 in FIG. 2) and typically, although not always, has a virtual machine monitor 246, which manages the operation of the virtual machine 248 as well as the interface with the host operating system (i.e., operating system 214). A software architecture executes within the virtual machine 248 such as an operating system 250, libraries 252, frameworks/middleware 254, applications 256 and/or presentation layer 258. These layers of software architecture executing within the virtual machine 248 can be the same as corresponding layers previously described or may be different.

Example Machine Architecture and Machine-Readable Medium

Figure 3:
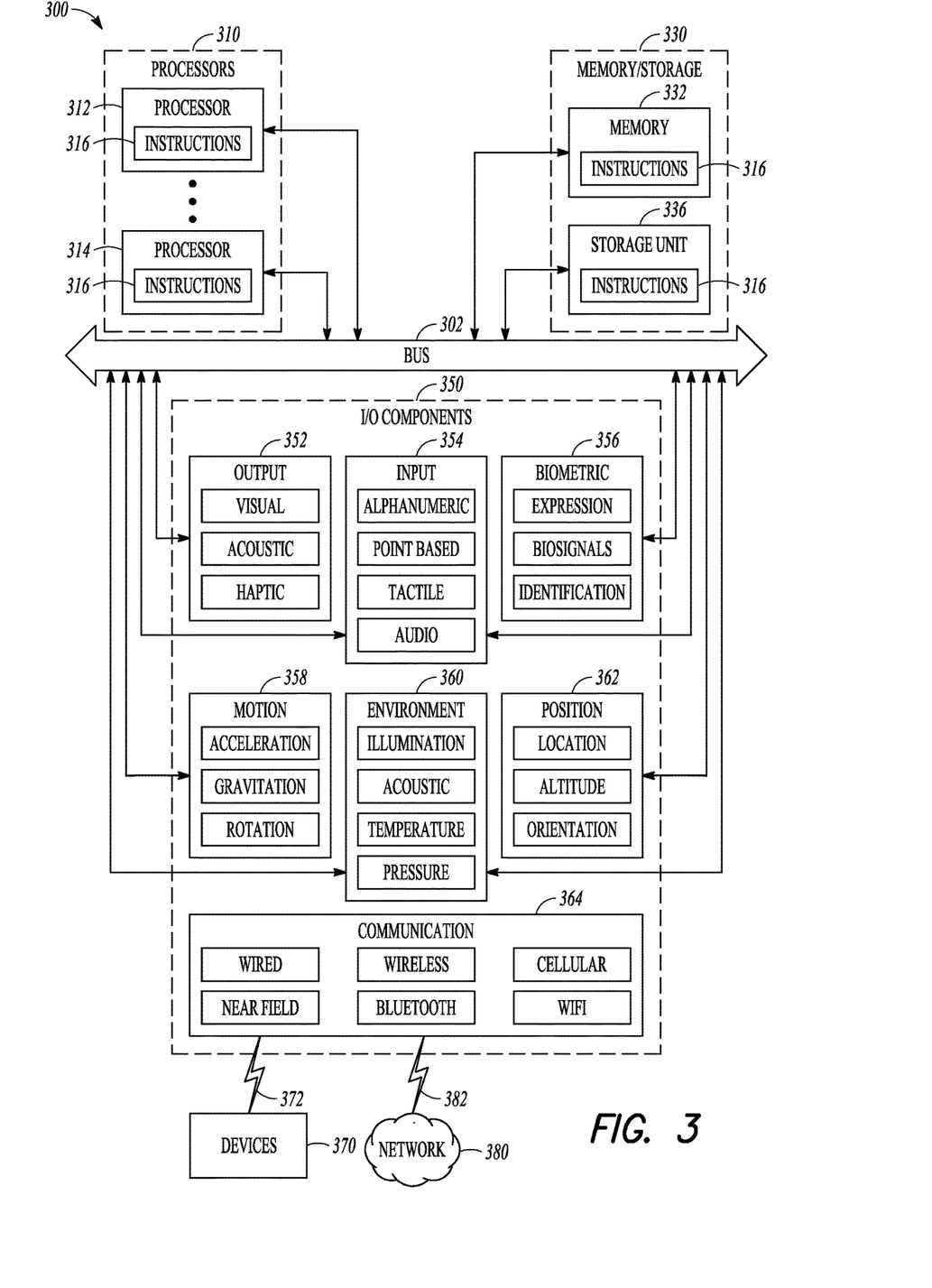
FIG. 3 illustrates a diagrammatic representation of a machine (for example, a mobile device) within which a set of instructions may be executed for causing the machine to perform any one or more of the methodologies discussed herein, according to an example embodiment.

FIG. 3 is a block diagram illustrating components of a machine 300, according to some example embodiments, able to read instructions from a machine-readable medium (e.g., a machine-readable storage medium) and perform any one or more of the methodologies discussed herein. Specifically, FIG. 3 shows a diagrammatic representation of the machine 300 in the example form of a computer system, within which instructions 316 (e.g., software, a program, an application, an applet, an app, or other executable code) for causing the machine 300 to perform any one or more of the methodologies discussed herein may be executed. For example the instructions 316 may cause the machine 300 to execute the flow diagram of FIG. 5. Additionally, or alternatively, the instructions 316 may implement appropriate modules, and so forth. The instructions 316 transform the general, non-programmed machine into a particular machine programmed to carry out the described and illustrated functions in the manner described.

In alternative embodiments, the machine 300 operates as a standalone device (e.g., a client device 110) or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a mobile device, desktop computer, laptop, portable digital assistants (PDAs), smart phones, tablets, ultra books, netbooks, laptops, programmable consumer electronics, a wearable device (e.g., a smart watch), a smart home device (e.g., a smart appliance), other smart devices, a web appliance, or any machine capable of executing the instructions 316, sequentially or otherwise, that specify actions to be taken by machine 300. Further, while only a single machine 300 is illustrated, the term "machine" shall also be taken to include a collection of machines 300 that individually or jointly execute the instructions 316 to perform any one or more of the methodologies discussed herein.

The machine 300 may include processors 310, memory 330, and I/O components 350, which may be configured to communicate with each other such as via a bus 302. In an example embodiment, the processors 310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 312 and processor 314 that may execute the instructions 316. The term "processor" is intended to include multi-core processor that may comprise two or more independent processors (sometimes referred to as "cores") that may execute instructions 316 contemporaneously. Although FIG. 3 shows multiple processors 310, the machine 300 may include a single processor with a single core, a single processor with multiple cores (e.g., a multi-core process), multiple processors with a single core, multiple processors with multiples cores, or any combination thereof.

The memory 330 may include a memory 332, such as a main memory, or other memory storage, and a storage unit 336, both accessible to the processors 310 such as via the bus 302. The storage unit 336 and memory 332 store the instructions 316 embodying any one or more of the methodologies or functions described herein. The instructions 316 may also reside, completely or partially, within the memory 332, within the storage unit 336, within at least one of the processors 310 (e.g., within the processor's cache memory), or any suitable combination thereof, during execution thereof by the machine 300. Accordingly, the memory 332, the storage unit 336, and the memory of processors 310 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 316. The term "machine-readable medium" shall also be taken to include any medium, or combination of multiple media, that is capable of storing instructions (e.g., instructions 316) for execution by a machine (e.g., machine 300), such that the instructions, when executed by one or more processors of the machine 300 (e.g., processors 310), cause the machine 300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 350 may include a wide variety of components to receive input, provide output, produce output, transmit information, exchange information, capture measurements, and so on. The specific I/O components 350 that are included in a particular machine will depend on the type of machine. For example, portable machines such as mobile phones will likely include a touch input device or other such input mechanisms, while a headless server machine will likely not include such a touch input device. It will be appreciated that the I/O components 350 may include many other components that are not shown in FIG. 3. The I/O components 350 are grouped according to functionality merely for simplifying the following discussion and the grouping is in no way limiting. In various example embodiments, the I/O components 350 may include output components 352 and input components 354. The output components 352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 350 may include biometric components 356, motion components 358, environmental components 360, or position components 362 among a wide array of other components. For example, the biometric components 356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 358 may include acceleration sensor components (e.g., accelerometer), gravitation sensor components, rotation sensor components (e.g., gyroscope), and so forth. The environmental components 360 may include, for example, illumination sensor components (e.g., photometer), temperature sensor components (e.g., one or more thermometer that detects ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 350 may include communication components 364 operable to couple the machine 300 to a network 380 or devices 370 via coupling 382 and coupling 372 respectively. For example, the communication components 364 may include a network interface component or other suitable device to interface with the network 380. In further examples, communication components 364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 370 may be another machine or any of a wide variety of peripheral devices (e.g., a peripheral device coupled via a Universal Serial Bus (USB)).

Moreover, the communication components 364 may detect identifiers or include components operable to detect identifiers. For example, the communication components 364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 364, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 380 or a portion of the network 380 may include a wireless or cellular network and the coupling 382 may be a Code Division Multiple Access (CDMA) connection, a Global System for Mobile communications (GSM) connection, or other type of cellular or wireless coupling. In this example, the coupling 382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 316 may be transmitted or received over the network 380 using a transmission medium via a network interface device (e.g., a network interface component included in the communication components 364) and utilizing any one of a number of well-known transfer protocols (e.g., hypertext transfer protocol (HTTP)). Similarly, the instructions 316 may be transmitted or received using a transmission medium via the coupling 372 (e.g., a peer-to-peer coupling) to devices 370. The term "transmission medium" shall be taken to include any intangible medium that is capable of storing, encoding, or carrying instructions 316 for execution by the machine 300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   at least one module, executing on at least one hardware processor of a machine and configured to improve interaction with a remote client device and to perform operations, the operations comprising at least:
   issuing, by the at least one hardware processor, a request for access to specified data residing on the client device, the request for access to specified data residing on the client device included in a request issued to the client device, the specified data residing in a first user-designated storage area on the client device;
   in response to receiving an authorization by a user of the client device of the access request, communicating by the at least one hardware processor, with an API data endpoint on the client device, to perform a data-pull of at least some of the requested specified data from a second user-designated data pull portion of data residing on the client device; and
   transmitting, by the at least one hardware processor, the requested specified data to be stored in a database.

2. The system of claim 1, wherein the request for access to specified data residing on the client device is included in an SMS message issued to the client device.

3. The system of claim 1, wherein the request for access to the specified data residing on the client device is issued in response to an instruction, received from the client device, to access the data residing on the client device.

4. The system of claim 1, wherein the at least one module is further configured to specify a recipient of the request and/or a type of data to be retrieved.

5. The system of claim 1, wherein the at least one module is further configured to specify a data characteristic to establish a data compatibility for a successful retrieval of at least some of the requested data.

6. The system of claim 1, wherein the second user-designated data pull portion of data is stored in the database and the database resides on the client device.

7. A method for configuring a data-handling improvement in a client device, the method including:
   issuing, by the at least one hardware processor; a request for access to specified data residing on the client device, the request for access to specified data residing on the client device included in a request issued to the client device, the specified data residing in a first user-designated storage area on the client device;
   in response to receiving an authorization by a user of the client device of the access request, communicating by the at least one hardware processor, with an API data endpoint on the client device, to perform a data-pull of at least some of the requested specified data from a second user-designated data pull portion of data residing on the client device; and transmitting, by the at least one hardware processor, the requested specified data to be stored in a database.

8. The method of claim 7, further comprising including the request for access to specified data residing on the client device in an SMS message issued to the client device.

9. The method of claim 7, wherein the request for access to the specified data residing on the client device is issued in response to an instruction, received from the client device, to access the data residing on the client device.

10. The method of claim 7, further comprising configuring the at least one module to specify a recipient of the request and/or a type of data to be retrieved.

11. The method of claim 7, further comprising configuring the at least one module to specify a data characteristic to establish a data compatibility for a successful retrieval of at least some of the requested data.

12. The method of claim 7, wherein the second user-designated data pull portion of data is stored in the database and the database resides on the client device.

13. A portable electronic client device comprising:
at least one module, executing on at least one hardware processor and configured to perform operations comprising, at least:
receiving, by the at least one hardware processor, a request for access to specified data residing on the client device, the request for access to specified data residing on the client device included in a request issued to the client device, the specified data residing in a first user-designated storage area on the client device;
based on an authorization by a user of the client device of the access request, communicating by the at least one hardware processor, via an API data endpoint on the client device, to perform a data-pull of at least some of the requested specified data from a second user-designated data pull portion of data residing on the client device; and
transmitting, by the at least one hardware processor, the requested specified data to be stored in a database.

14. The portable electronic client device of claim 13, wherein the request for access to specified data residing on the client device is included in an SMS message issued to the client device.

15. The portable electronic client device of claim 13, wherein the request for access to the specified data residing on the client device is issued in response to an instruction, received from the client device, to access the data residing on the client device.

16. The portable electronic client device of claim 13, wherein the at least one module is further configured to specify a recipient of the request and/or a type of data to be retrieved.

17. The portable electronic client device of claim 13, wherein the at least one module is further configured to specify a data characteristic to establish a data compatibility for a successful retrieval of at least some of the requested data.

18. The portable electronic client device of claim 13, wherein the second user-designated data pull portion of data resides in the database and the database resides on the client device.

* * * * *